(12) United States Patent
Kim et al.

(10) Patent No.: US 7,894,346 B2
(45) Date of Patent: Feb. 22, 2011

(54) MESSAGE TRANSMISSION IN WIRELESS ACCESS SYSTEM

(75) Inventors: Beom Joon Kim, Seoul (KR); Ki Seon Ryu, Seoul (KR); Yong Ho Kim, Gyeonggi-do (KR); Yong Won Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/463,292

(22) Filed: May 8, 2009

(65) Prior Publication Data

US 2009/0215458 A1  Aug. 27, 2009

Related U.S. Application Data

(63) Continuation of application No. 11/242,814, filed on Oct. 3, 2005, now Pat. No. 7,609,638.

(30) Foreign Application Priority Data

Oct. 4, 2004 (KR) .................. 10-2004-0078858
Jan. 17, 2005 (KR) .................. 10-2005-0004248

(51) Int. Cl.
 *H04B 7/00* (2006.01)
(52) U.S. Cl. .................. 370/235; 370/238; 370/311; 370/318
(58) Field of Classification Search .................. 370/235, 370/238, 311, 318
See application file for complete search history.

(56) References Cited

U.S. PATENT DOCUMENTS

| | | | |
|---|---|---|---|
| 7,050,397 B2 | 5/2006 | Cheng et al. | |
| 7,151,746 B2 | 12/2006 | Hiroki | |
| 7,227,856 B2 | 6/2007 | Wu | |
| 2002/0039901 A1 | 4/2002 | Sugimoto | |
| 2004/0203773 A1 | 10/2004 | Balasubramanian et al. | |
| 2004/0218556 A1 | 11/2004 | Son et al. | |
| 2006/0156164 A1 | 7/2006 | Meyer et al. | |
| 2007/0266292 A1 | 11/2007 | Korndewal et al. | |

FOREIGN PATENT DOCUMENTS

| | | |
|---|---|---|
| EP | 1450521 | 8/2004 |
| JP | 9-205669 | 8/1997 |
| JP | 2000-174824 | 6/2000 |
| KR | 1020040001077 | 1/2004 |
| WO | 2001-97549 | 12/2001 |

*Primary Examiner*—Yuwen Pan
(74) *Attorney, Agent, or Firm*—Lee, Hong, Degerman, Kang & Waimey

(57) ABSTRACT

A method for transmitting messages to alter the operating status between a mobile station and a base station in a wireless access system comprises, at the mobile station, transmitting a first message to the base station, setting a first count to a first predetermined value and enabling a first, the first message requesting a alteration in operating status between the mobile station and the base station, whereupon expiration of the first timer before receiving a second message from the base station, the count is decremented and, if the count is above a second predetermined value, the first timer is reset and the first message is retransmitted to the base station. The method also comprises, at a base station, receiving the first message, transmitting a second message to the mobile station and enabling a second timer, whereupon expiration of the second timer, the alteration in operating status is effected.

14 Claims, 12 Drawing Sheets

FIG. 1
Related Art

| Syntax | Size | Note |
|---|---|---|
| MOB-SCN-REQ Message Format(){ | | |
| Management Message Type=54 | 8 bits | |
| Scan duration | 8 bits | Frame unit |
| Interleaving interval | 8 bits | Frame unit |
| Scan iteration | 8 bits | |
| reserved | 4 bits | Set to 0 |
| HMAC Tuple | 12 bits | |
| } | | |

FIG. 2
Related Art

| Syntax | Size | Note |
|---|---|---|
| MOB-SCN-RSP Message Format(){ | | |
| Management Message Type=55 | 8 bits | |
| Scan duration | 8 bits | Frame unit |
| Start frame | 4 bits | |
| Interleaving interval | 8 bits | |
| Scan iteration | 8 bits | |
| Report mode | 2 bits | 0b00:no report<br>0b01:periodic report<br>0b10:event triggered report<br>0b11:reserved |
| reserved | 6 bits | Set to 0 |
| Scan report period | 8 bits | Usable only if a value of report mode is set. |
| HMAC Tuple | 21 bits | |
| } | | |

FIG. 3
Related Art

| Syntax | Size | Note |
|---|---|---|
| SLP-REQ-Message Format(){ | | |
| Management Message Type=50 | 8 bits | |
| Initial-sleep window | 6 bits | |
| Final-sleep-window base | 10 bits | |
| listening interval | 4 bits | |
| Final-sleep-window exponent | 3 bits | |
| N_sleep_CID | 8 bits | No.of Sleep_CID |
| For(I=0;i<N_sleep_CID;I++{ | | |
| Sleep_CID | 16 bits | |
| } | | |
| reserved | 1 bits | |
| } | | |

FIG. 4
Related Art

| Syntax | Size | Note |
|---|---|---|
| MOB-SLP-RSP Message Format (){ | | |
| Management Message Type=51 | 8 bits | |
| Sleep-approved | 1 bits | 0:sleep mode request rejection<br>1:sleep mode request addmission |
| If(Sleep-approved=0){ | | |
| REQ-duration | 7 bits | Time duration |
| } | | |
| else { | | |
| If(SHO or FBSS capability enabled){ | 4 bits | If SHO or FBSS capability is enabled in the REG-REQ/RSP message exchange |
| Maintain Active Set and Anchor BS ID | 2 bits | |
| if(Active Set and Anchor BS ID maintained){ | | |
| SHO/FBSS duration | | |
| } | | |
| } | | |
| Start frame | 6 bits | |
| inintial-sleep window | 6 bits | |
| final-sleep window base | 10 bits | |
| listening interval | 4 bits | |
| final-sleep window exponent | 3 bits | |
| SLPID | 10 bits | |
| Sleep duration | | Frame unit of 20ms |
| TLV encoded information | | |
| } | | |
| Padding | Variable | To secure Octet Arrangement |
| } | | |

FIG. 5
Related Art

| Syntax | Size | Note |
|---|---|---|
| DREG-REQ-Message Format(){ | | |
| Management Message Type=29 | 8 bits | |
| De-regisration-Request-Code | 8 bits | 0x00=SS de-registration request from BS and network<br>0x01=MSS de-registration & idle mode inintialization request from serving BS<br>0x02_0xFF=Reserved |
| TLV encoded parameters | variable | |
| } | | |

FIG. 6
Related Art

| Operation Code | Operation |
|---|---|
| 0x00 | MSS terminates service with current BS and tries network entry in another BS |
| 0x01 | MSS currently listens to current BS, but transmits nothing until RES-CMD message or DREG-CMD having action code 0x00 is received. |
| 0x02 | MSS currently listens to current BS but makes transmission at basic, primary or secondary management access only. |
| 0x03 | MSS returns to normal operation to transmit its active access. |
| 0x04 | MSS terminates normal operation with BS; BS transmits action code in response to DREG-REQ only. |
| 0x05 | MSS de-registration request and MSS idle mode initialization request from serving BS |
| 0x06 | MSS retransmits DREG-REQ message after REQ-duration. |
| 0x07 | MSS strands by for DREG-CMD message without retransmitting DREG-REQ message |
| 0x08~0xFF | Reserved |

MESSAGE TRANSMISSION IN WIRELESS ACCESS SYSTEM

CROSS-REFERENCE TO RELATED APPLICATIONS

This patent application is a continuation of U.S. Ser. No. 11/242,814, filed on Oct. 3, 2005, now U.S. Pat. No. 7,609,638, which pursuant to 35 U.S.C. §119(a), claims the benefit of earlier filing date and right of priority to Korean Application No. 2004-0078858, filed on Oct. 4, 2004 and Korean Application No. 2005-0004248, filed on Jan. 17, 2005, the contents of which are hereby incorporated by reference herein in their entirety.

FIELD OF THE INVENTION

The present invention relates generally to a wireless access system and, more particularly, to message transmission in a wireless access system.

BACKGROUND OF THE INVENTION

Generally, the system of IEEE802.16e in progress of international standardization for the broadband wireless access system consists of a mobile station (MS), a base station (BS) and an ASA (authentication service authorization) as an authentication management server. In this case, a common physical layer (PHY) and medium access control (MAC) layer are defined between the MS and the BS.

1. Scan

FIG. 1 is diagram of an exemplary format of a scan request (e.g., MOB-SCN-REQ) message. FIG. 2 is diagram of an exemplary format of a scan response (e.g., MOB-SCN-RSP) message. An MS requests a scanning interval from a currently accessed serving BS to measure a signal quality of a neighboring BS and to decide a target BS that will be accessed in handover. The request is performed via a scan request (MOB-SCN-REQ) message illustrated in FIG. 1. In response to the request, the serving BS transmits a scan response (MOB-SCN-RSP) message, as illustrated in FIG. 2, including information associated with scan to the MS.

2. Sleep Mode

A broadband wireless access system supports a sleep mode to minimize power consumption of an MS. An MS in sleep mode acts according to a sleep interval that is increased by a fixed rate. The sleep interval consists of a listening window and a sleep window.

A value of the listening window is fixed via a sleep request/response message. For the listening window, the MS is instructed via a broadcast MAC management message (MOB-TRF-IND) transmitted from the BS to indicate whether there exists downlink traffic intended for the MS and whether ranging needs to be performed for uplink communication maintenance and appropriate downlink coding type maintenance according to signal quality. The sleep window is an interval during which the MS receives minimal downlink signals from the BS in order to save power. For the sleep window, the MS performs a scanning of neighboring BSs for handover, a ranging for uplink communication maintenance and appropriate downlink coding type maintenance according to signal quality.

FIG. 3 is diagram of an exemplary format of a sleep request (e.g., MOB-SLP-REQ) message. FIG. 4 is diagram of an exemplary format of a sleep response (e.g., MOB-SLP-RSP) message. Initialization of the sleep mode is performed by exchanging a sleep request (MOB-SLP_REQ) message and a sleep response (MOB-SLP-RSP) message between the MS and the BS. Specifically, to enter the sleep mode from a normal operation mode, the MS transmits a sleep request (MOB-SLP-REQ) message, as illustrated in FIG. 3, to the BS. The BS then transmits a sleep response (MOB-SLP-RSP) message, as illustrated in FIG. 4, to the MS.

3. Idle Mode

Idle mode enables an MS to save power consumption by receiving only a periodically transmitted downlink broadcast traffic message (MOB-PAG-ADV) when moving through an area controlled by several BSs without registering with a specific BS. In the idle mode, the MS has no signaling requirement for handover. By restricting an action associated with scanning, the MS may save resources, such as power and a connection ID.

FIG. 5 is diagram of an exemplary format of a de-registration request (e.g., DREG-REQ) message. Referring to FIG. 5, the MS transmits a de-registration request (DREG-REQ) message to the BS for idle mode initialization. In response to the message, the BS then transmits a de-registration command (DREG-CMD) message including information associated with idle mode admission of the MS. After transmitting the DREG-CMD message to the MS, the BS releases management resources such as a basic connection for MAC management message exchange with the MS, a primary connection, and a secondary connection for standard-based messages (DHCP, TFTP, etc.).

FIG. 6 is diagram of an exemplary format of a de-registration command (e.g., DREG-CMD) message. As such, FIG. 6 illustrates action codes included in the DREG-CMD message. An MS performs an action according to an instruction indicated by the action code. For instance, if a code is 0X05, an MS performs a de-registration procedure in a corresponding BS and initializes an idle mode. Moreover, even if the MS does not request the DREG-REQ message, the BS may transmit a DREG-CMD (unsolicited DREG-CMD) message having an action code 0X05 to cause the MS to enter the idle mode.

As mentioned in the above explanation, the MS transmits one of a scan request (MOB-SCN-REQ), a sleep request (MOB-SLP-REQ) and a de-registration request (DREG-REQ) message to the BS and then awaits one of a scan response (MOB-SCN-RSP), a sleep response (MOB-SLP-RSP) and a de-registration command (DREG-CMD) message from the BS in response.

FIG. 7 is a signal flow diagram illustrating an exemplary case where scan request and response messages are lost. FIG. 8 is a signal flow diagram illustrating an exemplary case where sleep request and response messages are lost. FIG. 9 is a signal flow diagram illustrating an exemplary case where de-registration request and command messages are lost. Referring to FIGS. 7-9, due to the limited radio link resources and wireless environmental factors, the MOB-SCN-REQ, MOB-SLP-REQ and DREG-REQ messages transmitted from the MS may not be delivered normally to the BS or the MOB-SCN-RSP, MOB-SLP-RSP and DREG-CMD messages transmitted from the BS in response may not be delivered normally to the MS.

In such case, since a processing procedure for a next action of the MS is not defined in a current broadband wireless access system, it is highly probable that the MS or BS may perform a wrong action.

In the idle mode, the BS releases the connections (basic, primary and secondary connections) and transmits the DREG-CMD message to the MS. Therefore, if the MS fails to receive the DREG-CMD message and retransmits the DREG-REQ message, there is no available connection (basic connection). Furthermore, even if the MS does not request idle mode initialization via the DREG-REQ message, if the DREG-CMD (unsolicited DREG-CMD) message transmitted to cause the MS to enter the idle mode is lost, the MS continues to operate in a normal operation mode. However, after deciding that the MS has entered the idle mode, the BS releases management resources for the corresponding MS. Thereafter, the MS is unable to transmit messages to the BS.

SUMMARY OF THE INVENTION

Accordingly, the present invention is directed to message transmission in a wireless access system that substantially obviates one or more problems due to limitations and disadvantages of the related art.

An object of the present invention is to provide for transmission of messages between a mobile station and a base station in a wireless access system.

Another object of the present invention is to provide for transmission of a valid message in a case where a message is lost due to limited radio link resources and/or environmental radio factors.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method for transmitting messages to alter the operating status between a mobile station and a base station in a wireless access system comprises, at the mobile station, transmitting a first message to the base station, setting a first count to a first predetermined value and enabling a first, the first message requesting a alteration in operating status between the mobile station and the base station, whereupon expiration of the first timer before receiving a second message from the base station, the count is decremented and, if the count is above a second predetermined value, the first timer is reset and the first message is retransmitted to the base station. The method also comprises, at a base station, receiving the first message, transmitting a second message to the mobile station and enabling a second timer, the second message acknowledging the mobile station request for an alteration in operating status, whereupon expiration of the second timer, the alteration in operating status is effected and upon receiving another first message, the second message is retransmitted to the mobile station and the second timer is reset.

The first message may be a de-registration request (DREG-REQ), the first timer is a de-registration command standby timer, the first count is a de-registration request retransmission count, the alteration in operating status is a transition to an idle mode, the second message is a de-registration command (DREG-CMD), and the second timer is a management resource holding timer. The method may further comprise, at the mobile station, performing a scan operation in response to receiving the second message from the base station. The method may further comprise, at the mobile station, entering idle mode in response to receiving the second message from the base station.

In another embodiment, a method for altering the operating status between a mobile station and a base station in a wireless access system comprises receiving a first message, the first message requesting the alteration in operating status. The method also comprises transmitting a second message, the second message acknowledging the request for an alteration in operating status. The method also comprises enabling a timer, and upon expiration of the timer, effecting the alteration in operating status and upon receiving another first message, retransmitting the second message and resetting the timer.

The first message may be a de-registration request, the alteration in operating status is a transition to an idle mode, the second message is a de-registration command, and the timer is a management resource holding timer.

In yet another embodiment, a method for altering the operating status between a mobile station and a base station in a wireless access system comprises transmitting a first message, the first message indicating the alteration in operating status. The method also comprises enabling a first timer and setting a count to a first predetermined value. The method also comprises enabling a second timer, whereupon expiration of the first timer before receiving a second message, the count is decremented and, if the count is above a predetermined value, the first timer is reset and the first message is retransmitted and, whereupon expiration of the second timer, the alteration in operating status is effected.

The first message may be an unsolicited de-registration command, the alteration in operating status is a transition to an idle mode, the second message is one of a de-registration request and a de-registration acknowledgment, the first timer is a de-registration response standby timer, and the second timer is a management resource holding timer.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

FIG. 1 is diagram of an exemplary format of a scan request (e.g., MOB-SCN-REQ) message.

FIG. 2 is diagram of an exemplary format of a scan response (e.g., MOB-SCN-RSP) message.

FIG. 3 is diagram of an exemplary format of a sleep request (e.g., MOB-SLP-REQ) message.

FIG. 4 is diagram of an exemplary format of a sleep response (e.g., MOB-SLP-RSP) message.

FIG. 5 is diagram of an exemplary format of a de-registration request (e.g., DREG-REQ) message.

FIG. 6 is diagram of an exemplary format of a de-registration command (e.g., DREG-CMD) message.

DETAILED DESCRIPTION OF THE PREFERRED EMBODIMENTS

Figure 7:
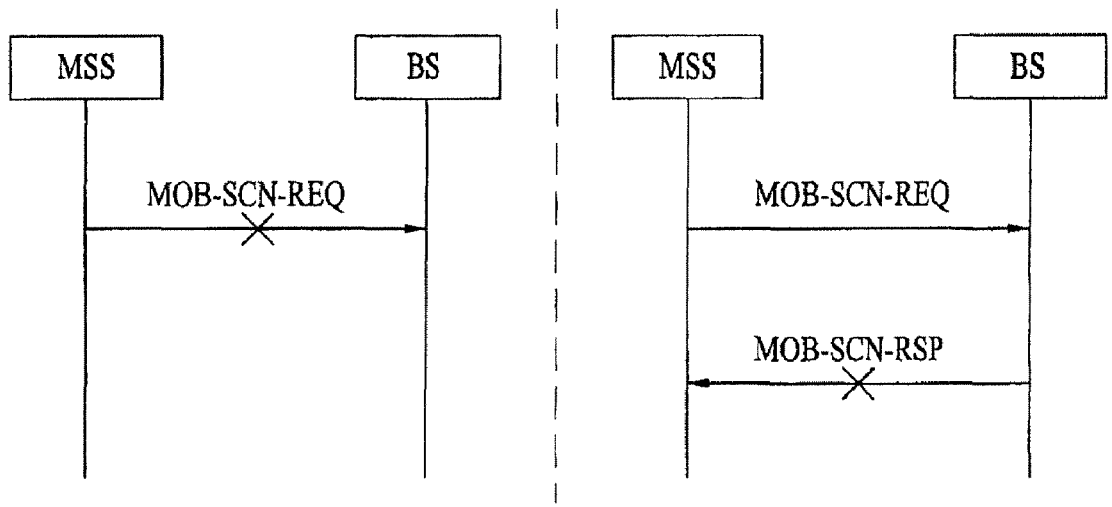
FIG. 7 is a signal flow diagram illustrating an exemplary case where scan request and response messages are lost.
Figure 8:
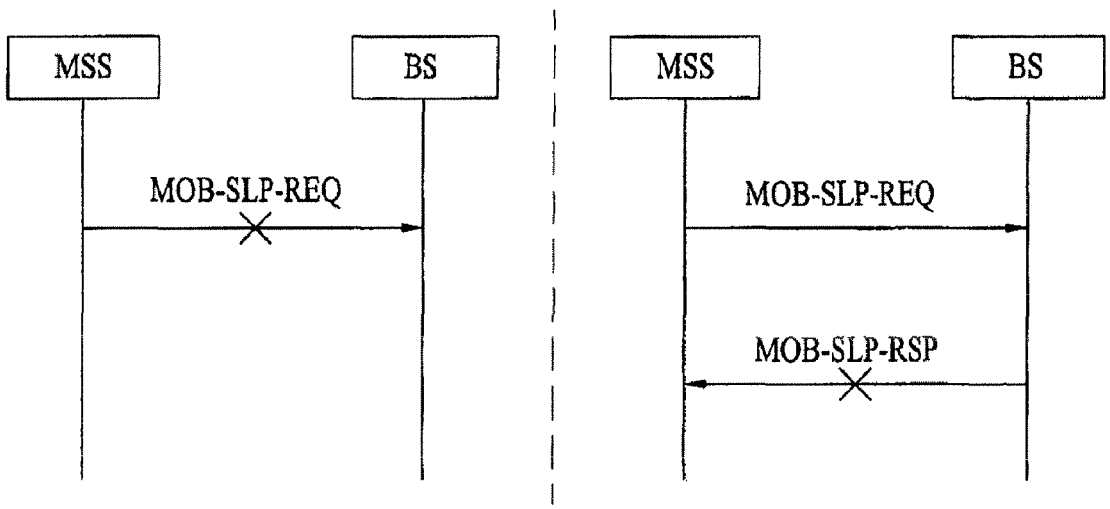
FIG. 8 is a signal flow diagram illustrating an exemplary case where sleep request and response messages are lost.
Figure 9:
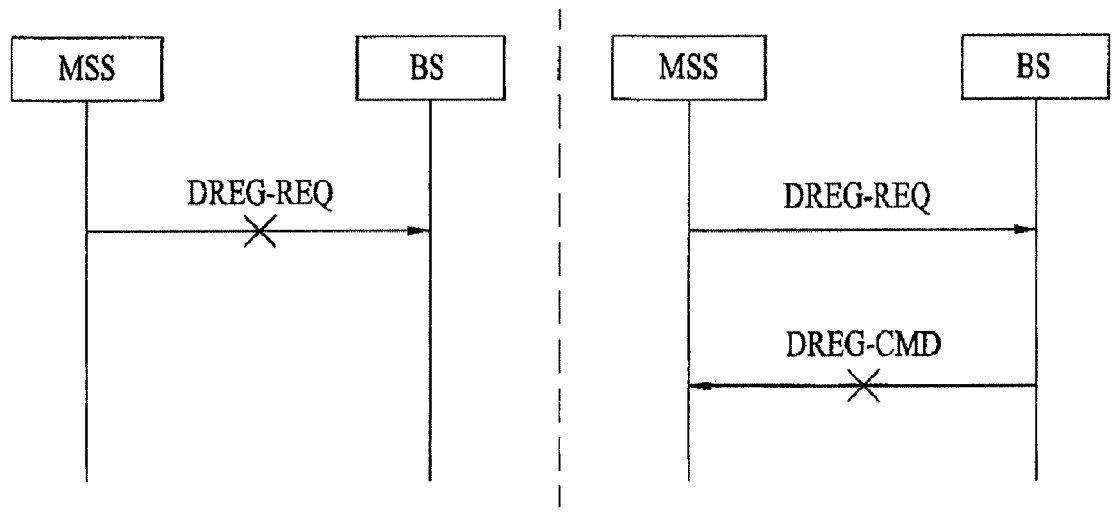
FIG. 9 is a signal flow diagram illustrating an exemplary case where de-registration request and command messages are lost.

Reference will now be made in detail to the preferred embodiments of the present invention, examples of which are illustrated in the accompanying drawings. Wherever possible, the same reference numbers will be used throughout the drawings to refer to the same or like parts.

The present invention is implemented in a wireless access system, such as a broadband wireless access system. The present invention is also applicable to wireless communication systems operating according to other standards.

The present invention proposes a method in a wireless access system for optimizing scan request (MOB-SCN-REQ) and scan response (MOB-SCN-RSP) messages, such that a mobile station (MS) may measure a channel quality of a neighboring base station (BS) for handover, sleep request (MOB-SLP-REQ) and sleep response (MOB-SLP-RSP) messages exchanged between an MS and a BS to initialize a sleep mode, and de-registration request (DREG-REQ) and de-registration command (DREG-CMD) messages exchanged between an MS and a BS to initialize an idle mode. Specifically, the present invention may provide a valid MS-to-BS message transmitting procedure if a message is lost due to limited radio link resources and/or environmental radio factors.

In the present invention, the MS performs retransmission of the request messages by operating response standby timers for scan, sleep and de-registration request messages and setting the request retransmission count of the messages.

First of all, the present invention carries out a retransmission of the scan request (MOB-SCN-REQ) message by setting a scan response standby timer and a scan request retransmission count when performing a scan operation.

The MS sets a scan response standby timer upon transmitting the MOB-SCN-REQ message to the BS. If the MOB-SCN-RSP message is not received from the BS prior to expiration of the timer, the MS considers the MOB-SCN-REQ or MOB-SCN-RSP message lost, e.g., lost over a radio link, and retransmits the MOB-SCN-REQ message to the BS if the scan request retransmission count is not exhausted.

Table 1 illustrates an exemplary drive time of a scan response standby timer and a scan request retransmission count according to the present invention.

TABLE 1

| System | Name | Action | Value |
| --- | --- | --- | --- |
| MS | Scan response standby timer | Time for standby until retransmitting scan request message if scan response message not received | 1 second |
|  | Scan request retransmission count | Available retransmission count of scan request message | 3 times |

Furthermore, an embodiment of the present invention may perform a retransmission of the sleep request (MOB-SLP-REQ) message by setting a sleep response standby timer and a sleep request retransmission count when initializing sleep mode.

The MS sets the sleep response standby timer upon transmitting the MOB-SLP-REQ message to the BS. If the MOB-SLP-RSP message is not received from the BS within a specific timer time, the MS considers the MOB-SLP-REQ or MOB-SLP-RSP message lost, e.g., lost over radio link, and retransmits the MOB-SLP-REQ message to the BS if the sleep request retransmission count is not exhausted.

Table 2 illustrates an exemplary drive time of a sleep response standby timer and a sleep request retransmission count according to the present invention.

TABLE 2

| System | Name | Action | Value |
| --- | --- | --- | --- |
| MS | Sleep response standby timer | Time for standby until retransmitting scan request message if sleep response message not received | 1 second |
|  | Sleep request retransmission count | Available retransmission count of sleep request message | 3 times |

Moreover, the present invention performs a retransmission of the de-registration request (DREG-REQ) message by setting a de-registration command standby timer and a de-registration request retransmission count upon initializing idle mode.

The MS sets the de-registration command standby timer upon transmitting the DREG-REQ message to the BS. If the DREG-CMD message is not received from the BS within a specific timer time, the MS considers the DREG-REQ or DREG-CMD message lost, e.g., lost over radio link, and retransmits the DREG-REQ message to the BS if the de-registration request retransmission count is not exhausted.

Table 3 illustrates an exemplary drive time of a de-registration command standby timer and a de-registration request retransmission count according to the present invention.

TABLE 3

| System | Name | Action | Value |
| --- | --- | --- | --- |
| MS | De-registration command standby timer | Time for standby retransmitting de-registration request message if de-registration message not received | 1 second |
|  | De-registration request retransmission count | Available retransmission count of de-registration request message | 3 times |

The BS sets a management resource holding timer upon transmitting the DREG-CMD message to the MS and maintains connections for a predetermined time. If the management resource holding timer expires, the BS releases the held management resources.

Table 4 illustrates an exemplary management resource holding timer according to the present invention.

TABLE 4

| System | Name | Action | Value |
|---|---|---|---|
| MS | Management resource holding timer | Time for holding management resources after transmitting de-registration command message to MS before releasing held management resources | 1 second |

Table 5 illustrates an exemplary drive time of a de-registration response standby timer and a de-registration command retransmission count according to the present invention.

TABLE 5

| System | Name | Action | Value |
|---|---|---|---|
| BS | De-registration response standby timer | Time for standby until receiving response message after transmitting de-registration command message | 1 second |
| | De-registration command retransmission count | Available retransmission count of de-registration command message | 3 times |

Table 6 illustrates a de-registration request code for a response with a DREG-REQ message according to the present invention if an MS receives an unsolicited DREG-CMD message not requested from a BS.

TABLE 6

| Syntax | Size (bits) | Notes |
|---|---|---|
| DREG-REQ message format( ){ | | |
| Management message type=49 | 8 | |
| De-registration Request Code | 8 | 0x00: MS de-registration request from BS and network<br>0x01: request for MS de-registration from Serving BS and initiation of MS Idle mode<br>0x02: Acknowledgement for unsolicited DREG-CMD<br>0x03-0xFF: Reserved |
| TLV encoded parameters | Variables | |
| } | | |

Table 7 illustrates a message format for a response with a DREG-ACK message according to the present invention if an MS receives an unsolicited DREG-CMD message not requested from a BS.

TABLE 7

| Syntax | Size (bits) | Notes |
|---|---|---|
| DREG-ACK message format( ){ | | |
| Management message type=xx | 8 | |
| Action Code | 8 | This indicates Action code from the BS |
| HMAC tuple | Variables | |
| } | | |

Figure 10:
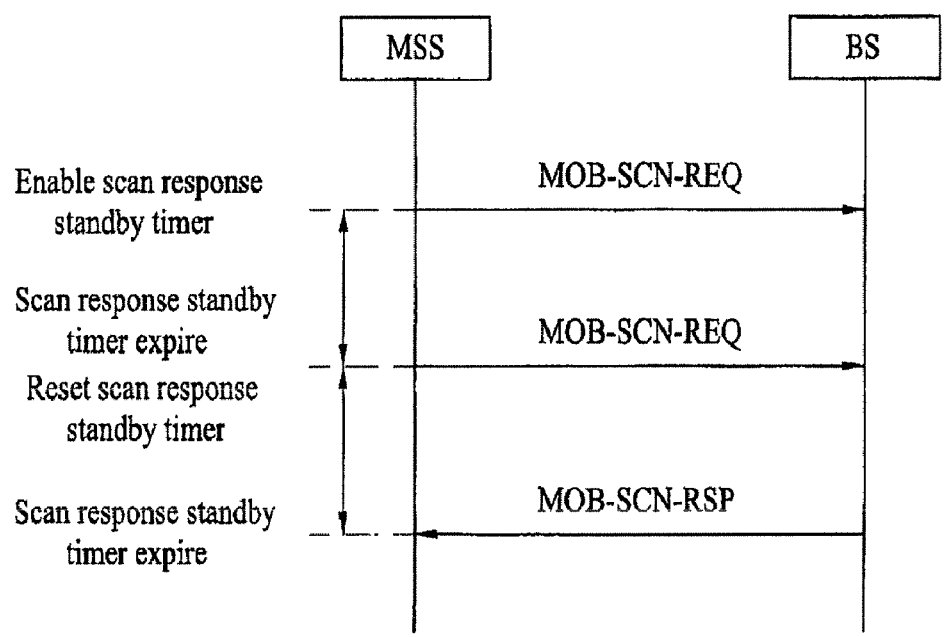
FIG. 10 is a signal flow diagram illustrating scan request and response messages using a scan response standby timer, according to an embodiment of the present invention.

FIG. 10 is a signal flow diagram illustrating scan request and response messages using a scan response standby timer, according to an embodiment of the present invention.

Referring to FIG. 10, an MS enables a scan response standby timer upon transmitting a scan request (MOB-SCN-REQ) message to a BS. If a scan response (MOB-SCN-RSP) message is not received before the scan response standby timer expires, the MS checks whether the scan request retransmission count is exhausted. If the scan request count is not exhausted, the MS retransmits the MOB-SCN-REQ message to the BS after resetting the timer. If the scan response (MOB-SCN-RSP) message is received from the BS prior to expiration of the scan response standby timer, the MS performs a scanning operation according to information included in the corresponding response message.

Figure 11:
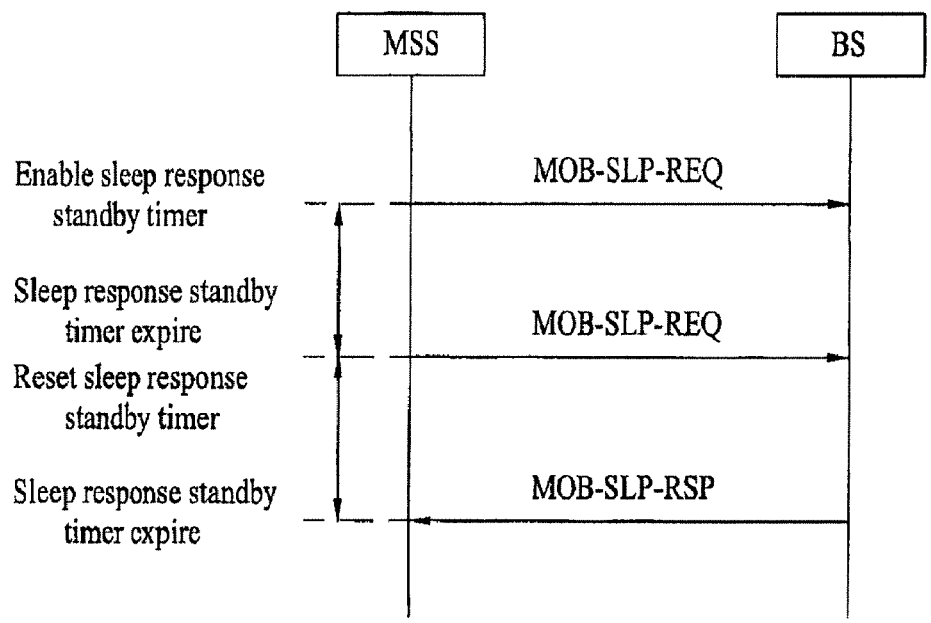
FIG. 11 is a signal flow diagram illustrating sleep request and response messages using a sleep response standby timer, according to an embodiment of the present invention.

FIG. 11 is a signal flow diagram illustrating sleep request and response messages using a sleep response standby timer, according to an embodiment of the present invention.

Referring to FIG. 11, an MS enables a sleep response standby timer upon transmitting a sleep request (MOB-SLP-REQ) message to a BS. If a sleep response (MOB-SLP-RSP) message is not received before the sleep response standby timer expires, the MS checks whether the sleep request retransmission count is exhausted. If the sleep request count is not exhausted, the MS retransmits the MOB-SLP-REQ message to the BS after resetting the timer. If the sleep response (MOB-SCN-RSP) message is received from the BS prior to expiration of the sleep response standby timer, the MS performs a sleep mode operation according to information included in the corresponding response message.

Figure 12:
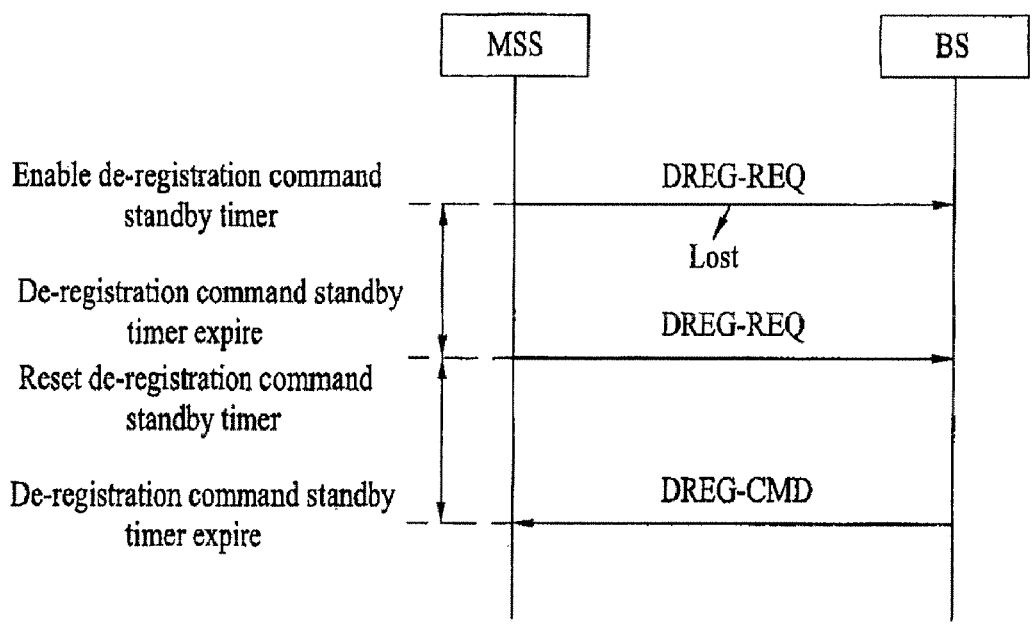
FIG. 12 is a signal flow diagram illustrating de-registration request and command messages using a de-registration command standby timer according to an embodiment of the present invention (e.g., a case where the de-registration request message transmitted from a mobile station is lost).

FIG. 12 is a signal flow diagram illustrating de-registration request and command messages using a de-registration command standby timer according to an embodiment of the present invention (e.g., a case where the de-registration request message transmitted from a mobile station is lost).

Referring to FIG. 12, an MS enables a de-registration command standby timer upon transmitting a de-registration request (DREG-REQ) message to a BS. If a de-registration command (DREG-CMD) message is not received before the de-registration command standby timer expires, the MS checks whether the de-registration request retransmission count is currently exhausted. If the de-registration request retransmission count is not exhausted, the MS retransmits the DREG-REQ message to the BS after resetting the timer. If the de-registration command (DREG-CMD) message is received from the BS prior to expiration of the de-registration command standby timer, the MS performs an idle mode operation according to information included in the corresponding response message.

Figure 13:
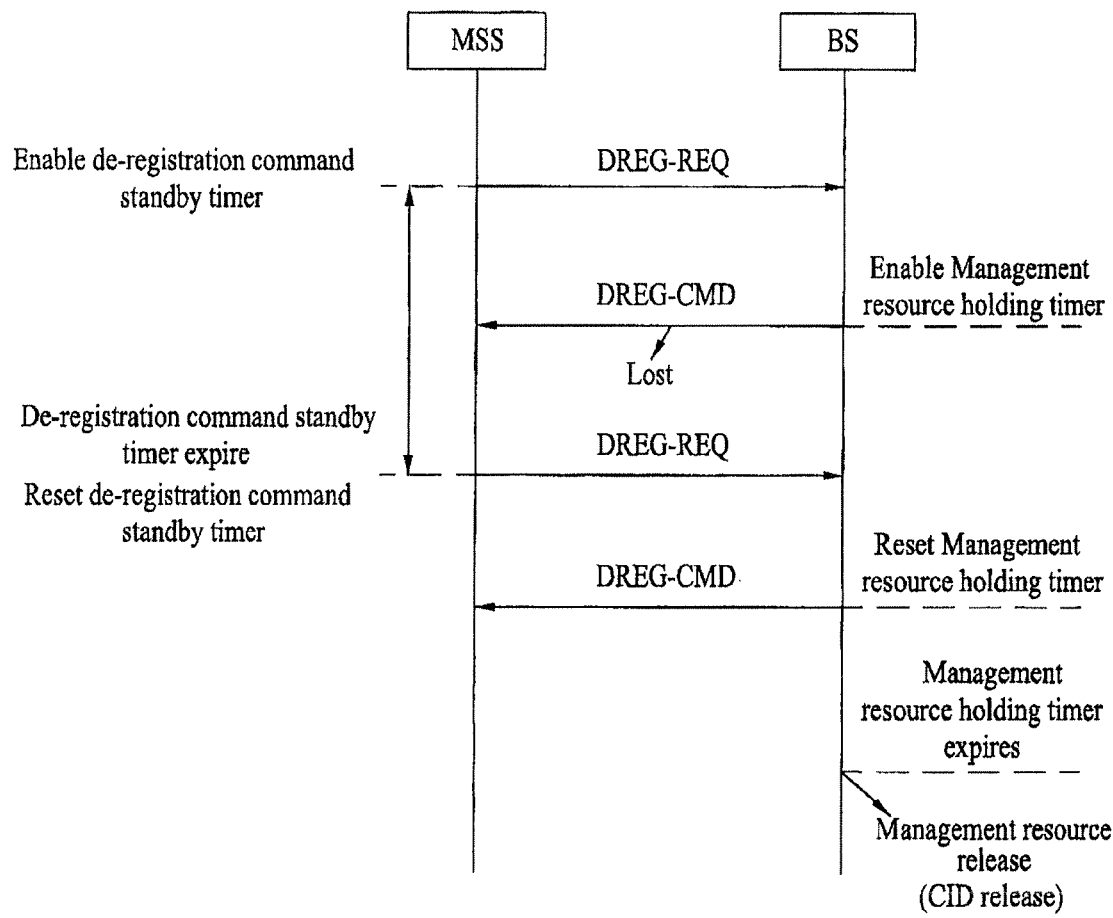
FIG. 13 is a signal flow diagram illustrating de-registration request and command messages using a de-registration command standby timer according to another embodiment of the present invention (e.g., a case where the de-registration command message transmitted from a base station is lost).

FIG. 13 is a signal flow diagram illustrating de-registration request and command messages using a de-registration command standby timer according to another embodiment of the present invention (e.g., a case where the de-registration command message transmitted from a base station is lost).

Referring to FIG. 13, a BS enables a management resource holding timer upon transmitting a de-registration command (DREG-CMD) message to a BS. If the DREG-CMD message is lost, e.g., lost over radio, the MS retransmits the DREG-REQ message via basic connection held by the management resource holding timer after the de-registration command standby timer expires. The BS retransmits the DREG-CMD message and resets the management resource holding timer. If the management resource holding timer expires after the DREG-CMD message has been transmitted normally, the BS decides that the MS has entered an idle mode and then releases management resources.

Figure 14:
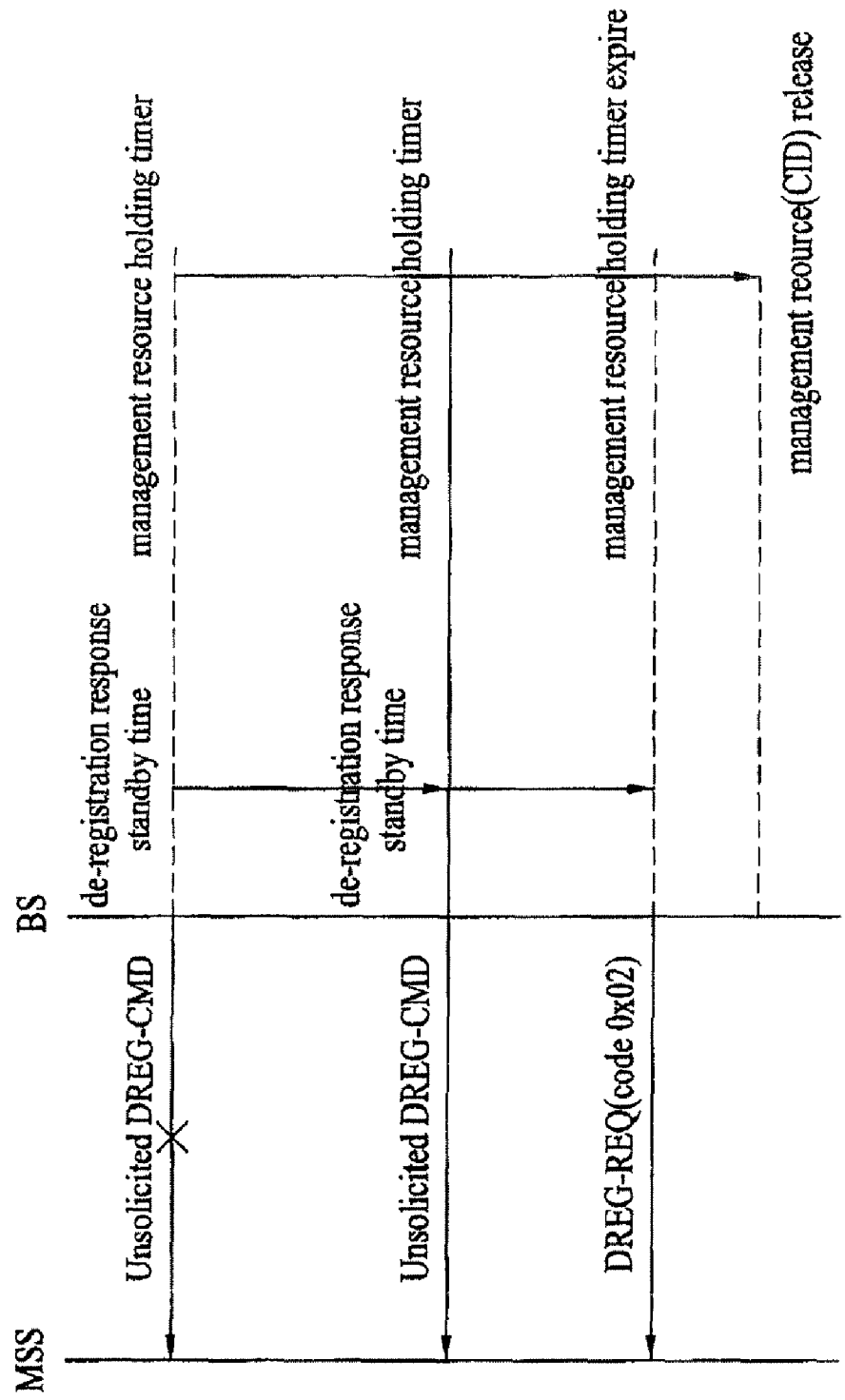
FIG. 14 and FIG. 15 are flow diagrams illustrating a method according to another embodiment of the present invention.
Figure 15:
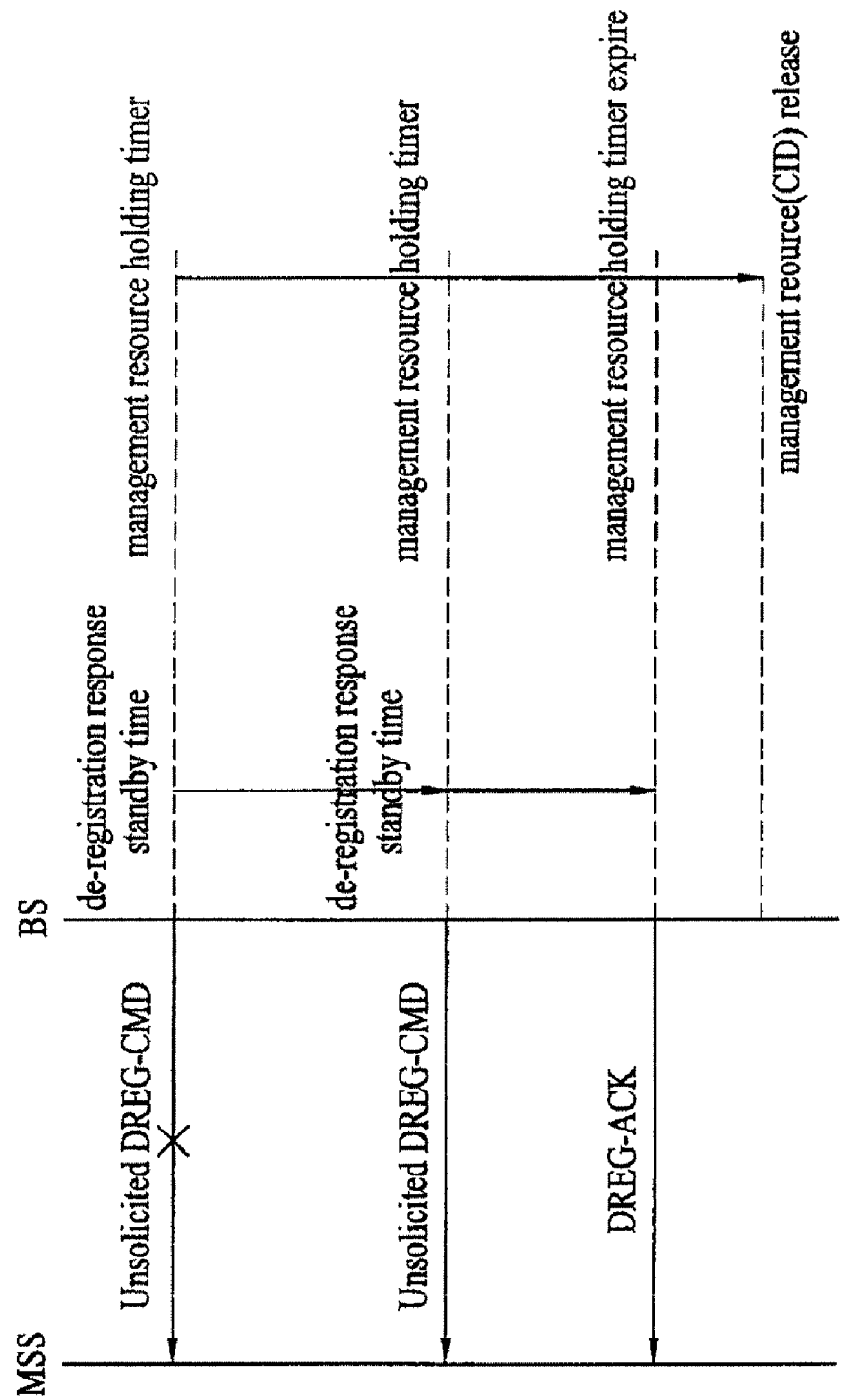

FIG. 14 and FIG. 15 are flow diagrams illustrating a method according to another embodiment of the present invention. Referring to FIGS. 14 and 15, an exemplary case is shown where, if a MS does not request idle mode initialization via a DREG-REQ message, an unsolicited de-registration command (DREG-CMD) message transmitted by a BS to a MS is lost.

The BS enables a management resource holding timer and a de-registration command standby timer to verify whether a previously set timer expires upon transmitting the unsolicited DREG-CMD message to the MS. If a de-registration response (DREG-REQ in FIG. 14 or DREG-ACK in FIG. 15) message is not received as an acknowledgement response for the unsolicited DREG-CMD message from the MS before the de-registration response standby timer expires, the BS checks whether the de-registration command retransmission count is currently exhausted. If the de-registration command count is not exhausted, the BS retransmits the unsolicited DREG-CMD message to the MS after resetting the de-registration command standby timer and resets the management resource holding timer. Thereafter, if a de-registration response (DREG-REQ or DREG-ACK) from the MS is received before the de-registration response standby timer expires, the BS releases management resources that have been held for the MS after the management resource holding timer expires.

FIG. 14 illustrates a case where the MS modifies the former de-registration request message to transmit the de-registration response message, as illustrated in the example in Table 6, to transmit the de-registration response message. FIG. 15 illustrates a case where the de-registration response message is transmitted via the DREG-ACK message, as illustrated in the example in Table 7.

In one embodiment, a method for transmitting messages to alter the operating status between a mobile station and a base station in a wireless access system comprises, at the mobile station, transmitting a first message to the base station, setting a first count to a first predetermined value and enabling a first, the first message requesting a alteration in operating status between the mobile station and the base station, whereupon expiration of the first timer before receiving a second message from the base station, the count is decremented and, if the count is above a second predetermined value, the first timer is reset and the first message is retransmitted to the base station. The method also comprises, at a base station, receiving the first message, transmitting a second message to the mobile station and enabling a second timer, the second message acknowledging the mobile station request for an alteration in operating status, whereupon expiration of the second timer, the alteration in operating status is effected and upon receiving another first message, the second message is retransmitted to the mobile station and the second timer is reset.

The first message may be a de-registration request (DREG-REQ), the first timer is a de-registration command standby timer, the first count is a de-registration request retransmission count, the alteration in operating status is a transition to an idle mode, the second message is a de-registration command (DREG-CMD), and the second timer is a management resource holding timer. The method may further comprise, at the mobile station, performing a scan operation in response to receiving the second message from the base station. The method may further comprise, at the mobile station, entering idle mode in response to receiving the second message from the base station.

In another embodiment, a method for altering the operating status between a mobile station and a base station in a wireless access system comprises receiving a first message, the first message requesting the alteration in operating status. The method also comprises transmitting a second message, the second message acknowledging the request for an alteration in operating status. The method also comprises enabling a timer, and upon expiration of the timer, effecting the alteration in operating status and upon receiving another first message, retransmitting the second message and resetting the timer.

The first message may be a de-registration request, the alteration in operating status is a transition to an idle mode, the second message is a de-registration command, and the timer is a management resource holding timer.

In yet another embodiment, a method for altering the operating status between a mobile station and a base station in a wireless access system comprises transmitting a first message, the first message indicating the alteration in operating status. The method also comprises enabling a first timer and setting a count to a first predetermined value. The method also comprises enabling a second timer, whereupon expiration of the first timer before receiving a second message, the count is decremented and, if the count is above a predetermined value, the first timer is reset and the first message is retransmitted and, whereupon expiration of the second timer, the alteration in operating status is effected.

The first message may be an unsolicited de-registration command, the alteration in operating status is a transition to an idle mode, the second message is one of a de-registration request and a de-registration acknowledgment, the first timer is a de-registration response standby timer, and the second timer is a management resource holding timer.

Accordingly, the present invention provides an effective processing procedure if messages are lost due to limited radio link resources and/or environmental radio factors in a wireless access system, thereby preventing malfunction in the MS or BS. Specifically, the present invention transmits the scan, sleep and de-registration request messages and operates response standby timers. Thus, even if the request messages or the response messages are lost, the corresponding request messages are retransmitted after expirations of the timers.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

The invention claimed is:

1. A method for supporting an idle mode operation efficiently in a wireless access system, the method comprising:

transmitting, from a base station to a mobile station, a de-registration command (DREG-CMD) message to initiate the idle mode in an unsolicited manner;

enabling, by the base station, a de-registration response standby timer for waiting for a de-registration request (DREG-REQ) message with a de-registration request code from the mobile station in response to the DREG-CMD message, wherein the de-registration request code indicates a response for the unsolicited DREG-CMD message;

setting, by the base station, a de-registration command count; and enabling, by the base station, a management resource holding timer for maintaining management resources after transmitting the DREG-CMD message to the mobile station, wherein the base station retransmits the de-registration command message when the de-registration response standby timer expires before the base station receives the de-registration request (DREG-REQ) message and the de-registration command count is not exhausted.

2. The method of claim 1, further comprising:
receiving, by the base station from the mobile station, the de-registration request message in response to the de-registration command message before the de-registration response standby timer expires.

3. The method of claim 1, wherein the management resources comprises connection information.

4. The method of claim 3, wherein the connection information comprises information related with at least one of a basic connection, a primary connection, or a secondary connection.

5. The method of claim 1, further comprising:
decrementing, at the base station, the de-registration command count when the base station retransmits the de-registration command message to the mobile station.

6. The method of claim 5, wherein the base station ceases to retransmit the de-registration command message when the de-registration command count is exhausted.

7. The method of claim 1, wherein the base station resets the management resource holding timer after retransmitting the de-registration command message.

8. The method of claim 7, wherein the base station decreases the de-registration command count when the base station retransmits the de-registration command message to the mobile station.

9. The method of claim 1, wherein the de-registration request code is set to 0x02.

10. A base station for supporting an idle mode operation efficiently in a wireless access system, the base station configured for:

transmitting a de-registration commend (DREG-CMD) message to a mobile station to initiate the idle mode in an unsolicited manner;

enabling a de-registration response standby timer for waiting for a de-registration request (DREG-REQ) message with a de-registration code from the mobile station in response to the DREG-CMD message, wherein the de-registration request code indicates a response for the unsolicited DREG-CMD message;

setting a de-registration command count; and enabling a management resource holding timer for maintaining management resources after transmitting the DREG-CMD message to the mobile station, wherein the base station retransmits the de-registration command message when the de-registration response standby timer expires before the base station receives the de-registration request (DREG-REQ) message and the de-registration command count is not exhausted.

11. The base station of claim 10, wherein the base station is further configured for:
receiving the de-registration request message in response to the de-registration command message.

12. The base station of claim 10, wherein the management resource comprising connection information comprises information related with at least one of a basic connection, a primary connection, or a secondary connection.

13. The base station of claim 10, wherein the base station ceases to retransmit the de-registration command message when the de-registration command count is exhausted.

14. The base station of claim 10, wherein the de-registration request code is set to 0x02.

* * * * *